(12) United States Patent
Schendel et al.

(10) Patent No.: US 7,945,541 B1
(45) Date of Patent: May 17, 2011

(54) VERSION SET OF RELATED OBJECTS

(75) Inventors: Claire Schendel, Petaluma, CA (US);
Michael Slater, Sebastopol, CA (US);
Johnnie B. Manzari, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1020 days.

(21) Appl. No.: 11/134,198

(22) Filed: May 20, 2005

(51) Int. Cl.
*G06F 7/00* (2006.01)
*G06F 17/00* (2006.01)
(52) U.S. Cl. ............................................ 707/695
(58) Field of Classification Search .................. 707/695, 707/638, 999.203
See application file for complete search history.

(56) References Cited

U.S. PATENT DOCUMENTS

| | | | | |
|---|---|---|---|---|
| 5,890,176 | A * | 3/1999 | Kish et al. | 715/205 |
| 6,301,592 | B1 * | 10/2001 | Aoyama et al. | 715/229 |
| 6,918,082 | B1 * | 7/2005 | Gross et al. | 715/206 |
| 2003/0028553 | A1 * | 2/2003 | Kondo | 707/200 |
| 2003/0200235 | A1 * | 10/2003 | Choy et al. | 707/203 |

* cited by examiner

*Primary Examiner* — Hosain T Alam
*Assistant Examiner* — Van H Oberly
(74) *Attorney, Agent, or Firm* — Robert C. Kowert; Meyertons, Hood, Kivlin, Kowert & Goetzel, P.C.

(57) ABSTRACT

Briefly, in accordance with one or more embodiments, a version set of related objects may comprise a set and/or a group of multiple versions of an object such as multiple edited versions that may be displayed, rendered, manipulated, edited, and/or otherwise handled as a related grouping.

42 Claims, 7 Drawing Sheets

VERSION SET OF RELATED OBJECTS

BACKGROUND

Graphics editing software provides powerful capabilities for a user to create, manipulate, edit, modify, and/or otherwise control how files such as photographs and/or the like type of files and/or objects are displayed. Typically, a user may obtain a source file, and then edit the source file in a series of edits that creates one or more edited versions of the original source file until the user arrives at a satisfactory edited version. However, it can become difficult and/or unwieldy for a user to track and/or manage all of the various edited versions, which may often lead to confusion on which edited version is the desired version. Furthermore, a user may subsequently desire to create a new edited version of the file that may be based on an earlier version of the file but not necessarily based on the most recent version or the original version of the source file. In addition, over a period of time, a user may have several editing projects being worked on simultaneously where each project may have multiple edited versions of the file to manage and/or track.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Some portions of the detailed description that follows are presented in terms of processes, programs and/or symbolic representations of operations on data bits and/or binary digital signals within a computer memory, for example. These process descriptions and/or representations may include techniques used in the data processing arts to convey the arrangement of a computer system and/or other information handling system to operate according to such programs, processes, and/or symbolic representations of operations.

A process may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It may be convenient at times, principally for reasons of common usage, to refer to these signals as bits, values, elements, symbols, characters, terms, numbers and/or the like. However, these and/or similar terms may be associated with the appropriate physical quantities, and are merely convenient labels applied to these quantities.

Unless specifically stated otherwise, as apparent from the following discussions, throughout the specification discussion utilizing terms such as processing, computing, calculating, determining, and/or the like, refer to the action and/or processes of a computing platform such as computer and/or computing system, and/or similar electronic computing device, that manipulate and/or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

Embodiments claimed may include one or more apparatuses for performing the operations herein. Such an apparatus may be specially constructed for the desired purposes, or it may comprise a general purpose computing device selectively activated and/or reconfigured by a program stored in the device. Such a program may be stored on a storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and/or programmable read only memories (EEPROMs), flash memory, magnetic and/or optical cards, and/or any other type of media suitable for storing electronic instructions, and/or capable of being coupled to a system bus for a computing device, computing platform, and/or other information handling system.

The processes and/or displays presented herein are not inherently related to any particular computing device and/or other apparatus. Various general purpose systems may be used with programs in accordance with the teachings herein, or a more specialized apparatus may be constructed to perform the desired method. The desired structure for a variety of these systems will appear from the description below. In addition, embodiments are not described with reference to any particular programming language. It will be appreciated that a variety of programming languages may be used to implement the teachings described herein.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In one or more embodiments, an object may refer to an item that may be selected and/or manipulated, for example shapes, pictures, images, text, and/or text boxes that may appear on a display as rendered by a computing platform coupled to the display. In one or more embodiments, the term render may refer to displaying an object on a display coupled to a computing platform, and/or to manipulating the object on the display. In one or more embodiments, graphic may refer to a pictorial and/or image representation of an object, and in one or more alternative embodiments may refer to an object itself. In one or more embodiments, a graphic element may be single and/or fundamental graphic object, and/or a portion thereof. In one or more embodiments, a letterform may be a shape and/or design of a letter of an alphabet. In one or more embodiments, a font may refer to a design for a set of characters and/or letters for printing and/or displaying. In one or more embodiments, text may refer to letters and/or characters that may be manipulated and/or combined as words, lines, and/or pages. However, these are merely example definitions of the above terms, phrases, and/or concepts wherein other definitions may apply as well, and the scope of claimed subject matter is not limited in these respects. In one or more embodiments, to parse may refer to dividing computer code into elements that can be analyzed and/or identified. In one or more embodiments, file may refer to a collection of data, code, instructions, and/or other information that may be readable, accessible, and/or able to be acted on by a computing platform and/or the like. In one or more embodiments, a format may refer to a predefined organizational structure for data, code, instructions, and/or other information that may be readable, accessible, and/or able to be acted on by a computing platform and/or the like. In one or more embodiments, a graphical user interface (GUI) may refer to a program interface that utilizes displayed graphical information to allow a user to control and/or operate a computing platform and/or the like. A pointer may refer to a cursor and/or other symbol that appears on a display screen that may be moved and/or controlled with a pointing device to select objects, and/or input commands via a graphical user interface of a computing platform and/or the like. A pointing device may refer to a device used to control a cursor, to select objects, and/or input commands via a graphical user interface of a computing platform and/or the like. Pointing devices may include, for example, a mouse, a trackball, a track pad, a track stick, a keyboard, a stylus, a digitizing tablet, and/or similar types of devices. A cursor may refer to a symbol and/or a pointer where an input selection and/or actuation may be made with respect to a region of in a graphical user interface. In one embodiment, content reflow may refer to where the contents of a document may be rearranged to alter the layout, order, and/or readability of the content of the document. In one or more embodiments, transient may refer to being in a state for a brief and/or temporary period of time, and/or passing with time and/or a temporary state of being. In one or more embodiments, an icon may refer to a smaller sized picture that may represent an object, a file, and/or a program, and in some embodiments, an icon may be a thumbnail, wherein a thumbnail may refer to a smaller sized image and/or picture of an object, a file, and/or a program, and/or a portion thereof. However, these are merely example definitions of terms relating to graphical user interfaces and/or computing platforms and/or the like, and the scope of claimed subject matter is not limited in this respect.

In one or more embodiments, a database may refer an organization of information created, stored, accessed, edited, and/or otherwise utilized by a computing platform. In one or more embodiments, a tag may refer to a command contained in a file, object, and/or document that may specify how the file, object, and/or document, and/or a portion thereof, may be formatted. In one or more embodiments, metadata may refer to information pertaining to data contained in a file, object, and/or document, for example formatting information, date of creation, date of editing, date saved, how data was obtained, and/or from where data was obtained. Such metadata, for example, may be utilized in for database management purposes and/or for data warehousing of multiple databases, although the scope of claimed subject matter is not limited in this respect. In one or more embodiments, an application programming interface (API) may refer to a set of routines, protocols, and/or tools utilized to cause a program to operate in conjunction with an operating system. In one or more embodiments, an operating system may refer to a program to execute on a computing platform to handle input and/or output commands, file management, printing, displaying, storing, and/or communicating of information for the computing platform. However, these are merely examples of database and/or operating system functions, and the scope of claimed subject matter is not limited in these respects.

Figure 1:
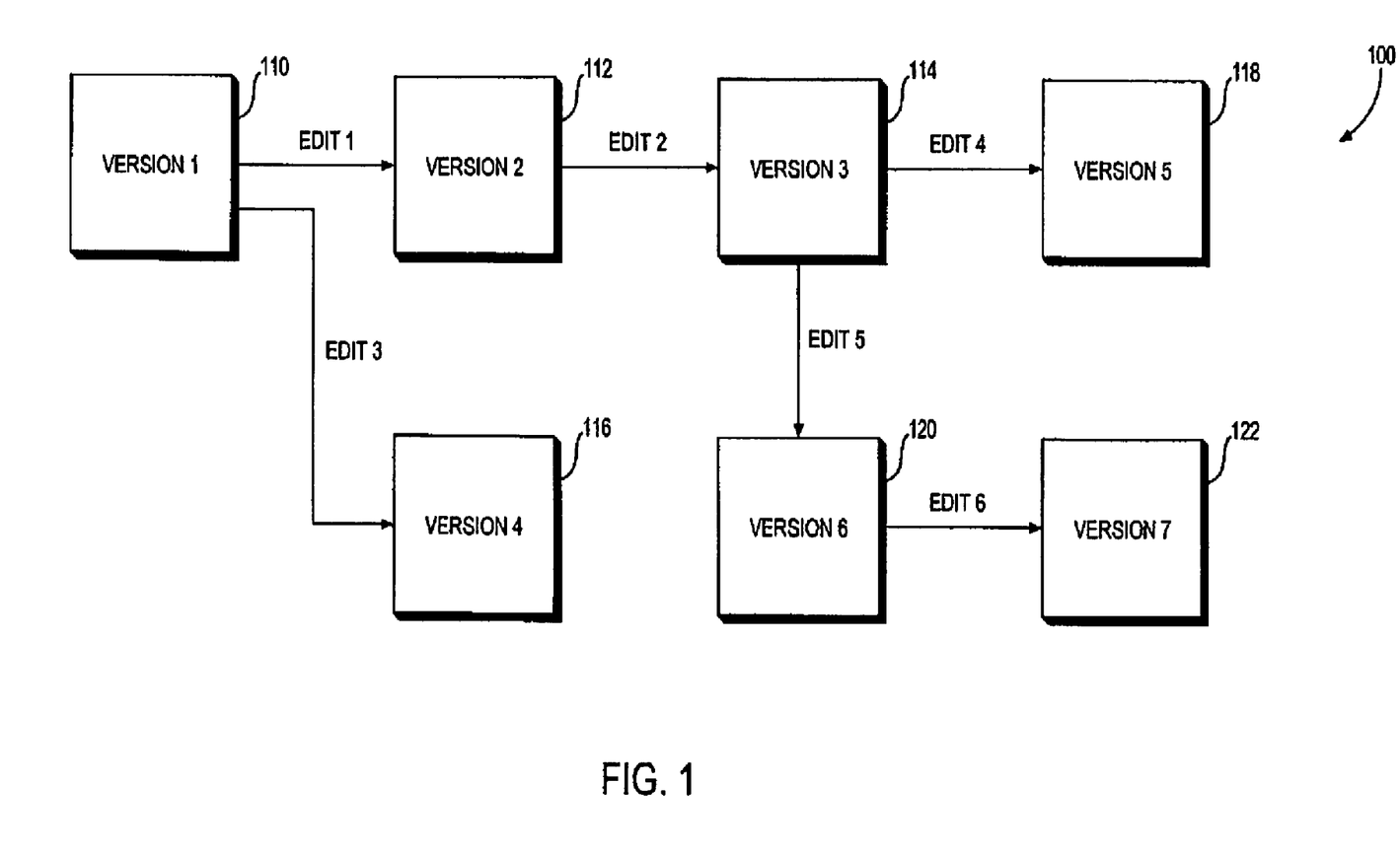
FIG. 1 is a block diagram of a version set in accordance with one or more embodiments.

Referring now to FIG. 1, a block diagram of a version set in accordance with one or more embodiments will be discussed. As shown in FIG. 1, in one or more embodiments, a version set such as version set 100 may refer to a grouping and/or set of objects that are related, for example where a second object in a version set may be an edited version of a first object and/or a subsequent version of the first object. In one or more embodiments, the first and the second object may be embodied as two separate files having such a relationship to be referred to in a group and/or set as a version set. In one or more embodiments, a first version of an object may refer to an earlier version of the object, and a second and/or subsequent version of the object may refer to a later version of the object, for example with respect to time. For example, as shown in FIG. 1, version set 100 may include first version (VERSION 1) 110 of an object, where the object may be an image file for example. A user may perform a first edit (EDIT 1) on first version 110 to arrive at second version (VERSION 2) 112 of the object. Such an edit may be performed, for example, on an object such as an image displayed and/or rendered in a digital imaging, creating, and/or editing program such as Adobe® Photoshop® CS2 program and/or Adobe® Photoshop® Elements 3.0, both available from Adobe Systems Incorporated of San Jose, Calif., USA, although the scope of claimed subject matter is not limited in this respect.

As shown in FIG. 1, version set 100 may comprise a set of one or more versions of the object arrived at, for example, via various editing processes of various versions of the object following various editing paths. For example, a user may create third version (VERSION 3) 114 of the object based at least in part on editing of second version 112 of the object in a second editing process (EDIT 2). Likewise, a user may create fourth version (VERSION 4) 116 of the object based at least in part on editing of first version 110 of the object in a third editing process (EDIT 3). Similarly, a user may create fifth version (VERSION 5) 118 of the object based at least in part on editing of third version 114 of the object in a fourth editing process (EDIT 4). Likewise, a user may create sixth version (VERSION 6) 120 of the object based at least in part on editing of third version 114 of the object in a fifth editing process (EDIT 5). Similarly, a user may create seventh version (VERSION 7) 122 of the object based at least in part on editing of sixth version 120 of the object in a sixth editing process (EDIT 6). However, this is merely an example of the various versions of an object that may be obtained via multiple paths of editing multiple versions of the object, and the scope of claimed subject matter is not limited in this respect. Version set 100, may comprise a set and/or grouping and/or relationship of one or more of first version 110 through seventh version 122 of the object, although the scope of claimed subject matter is not limited in this respect.

Figure 2:
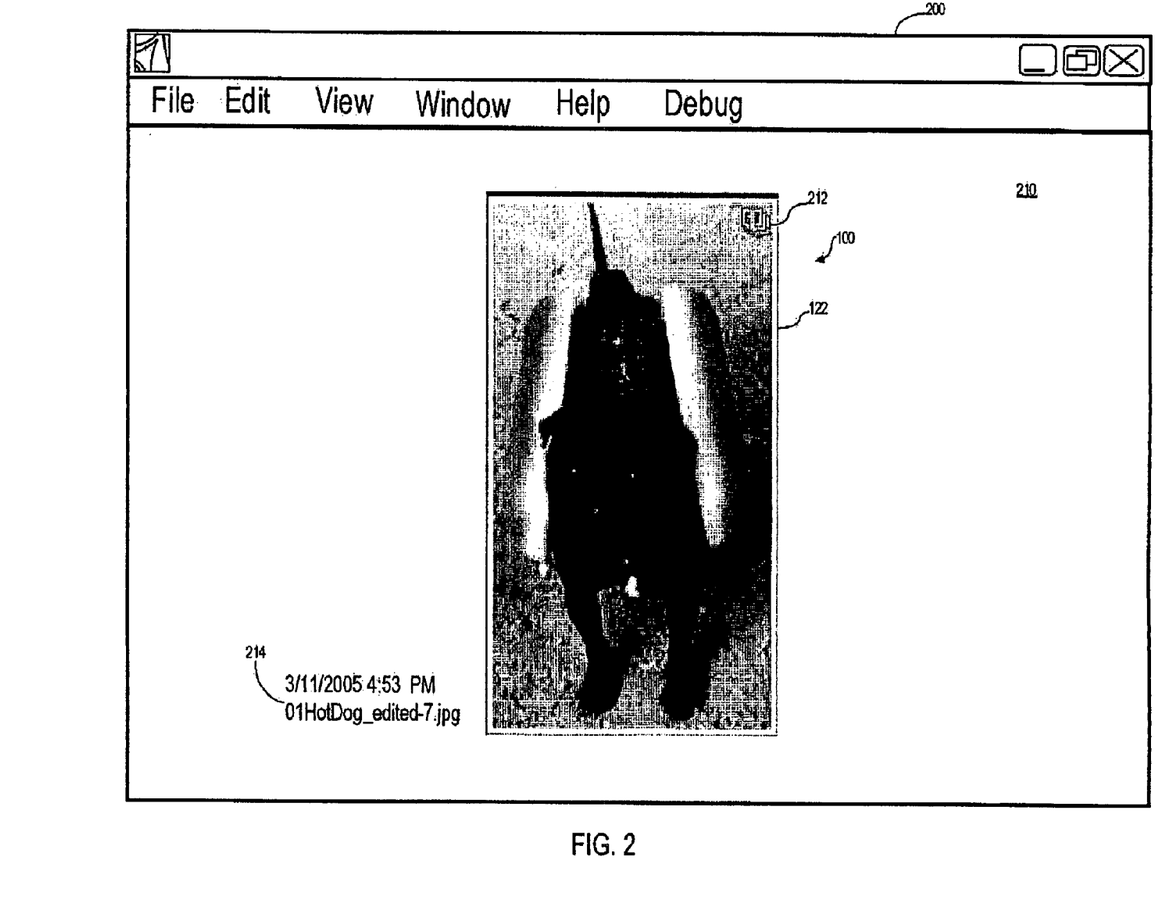
FIG. 2 is a diagram of a program to view and/or show a stacked mode of a version set in accordance with one or more embodiments.

Referring now to FIG. 2, a diagram of a program to view and/or show a stacked mode of a version set in accordance with one or more embodiments will be discussed. As shown in FIG. 2, version set 100 of FIG. 1 may be created, viewed, displayed, and/or edited via program 200. In one or more embodiments, version set 100 may comprise one or more objects, and/or one or more versions of the object, as a portion of a file 210 which may be, for example, a portable document format (PDF) type file. Version set 100 may be shown in FIG. 2 via program 200 in a stacked arrangement. In such a stacked arrangement, one of the versions of the object, for example seventh version 122, may be rendered and/or displayed, and one or more of the remaining versions of the object may be hidden and/or otherwise not rendered and/or displayed. A version set stack icon 212 may indicate to a user that program is displaying version set 100 in a stacked mode, and label 214 may provide additional information to the user regarding version set 100, for example an indication of the version of the currently displayed an/or rendered version of the object, a file name for the currently displayed and/or rendered version, and/or a filename and/or a portion of a filename common to versions of the object in version set 100, and/or a date and/or a time on which the currently displayed and/or rendered version of version set 100 was created and/or saved. In one or more embodiments, when a user creates a version set of an object having one or more versions of the object, program 200 may automatically create such information for label 214, for example without requiring user intervention.

In one or more embodiments, program 200 may be, for example, a photo and/or an image browser capable of creating, viewing, rendering, manipulating, and/or editing an object such as a photograph and/or other type of image file. File 210 may include, for example, a photograph, image file, audio file, video file, media file, a portable document format (PDF) type file, a word processor type file, a hypertext markup language type file, and/or the like. When a user creates and/or edits multiple versions of an object, program 200 may automatically define a relationship between the multiple versions and/or define a grouping and/or set of the multiple versions as a version set, for example version set 100. Program 200 may display version set 100 in an unstacked, or planar grouping of the multiple versions, where for example two or more of the multiple versions of the object may be viewed, displayed, and/or rendered concurrently, and/or program may display version set 100 in a stacked grouping such as shown in FIG. 2, where for example a selected version of the multiple versions of the object may be viewed, displayed, and/or rendered and/or other versions of the multiple versions of the object may not be viewed, displayed, and/or rendered concurrently with the selected version of the object. In one or more embodiments, in a stacked mode and/or arrangement, program 200 may indicate to as user that version set 100 is currently viewed, displayed, and/or rendered in a stacked mode. In one embodiment, the selected version by default may be the latest edited version and/or the current version, for example seventh version 122 in version set 100. Alternatively, a user may designate which version of the multiple versions of the object that the user desired program 200 to display when in a stacked mode and/or arrangement. In one or more embodiments, when a user prints version set 100, program 200 may print the currently selected and/or displayed version of the stacked mode and/or arrangement, and/or alternatively, the user may choose to print one or more of the multiple versions of version set 100, although the scope of claimed subject matter is not limited in this respect.

In one or more embodiments, a user may refer back to one or more earlier versions of the object in version set 100 wherein original versions of the object and/or intermediate versions of the object are not automatically discarded by program 200 when a new version of the object is created and/or saved. Furthermore, version set 100 may be automatically created by program 200 without requiring user intervention and/or manual naming of multiple versions of the object. In one or more embodiments, version set 100 may by created and/or maintained via program 200. In alternative embodiments, version set 100 may be created and/or maintained via an application program interface and/or other tools, routines, and/or protocols of an operating system. In further alternative embodiments, version set 100 may be created and/or maintained via an operating system. However, these are merely examples of creation and/or maintenance of version sets, and the scope of claimed subject matter is not limited in these respects.

Figure 3:
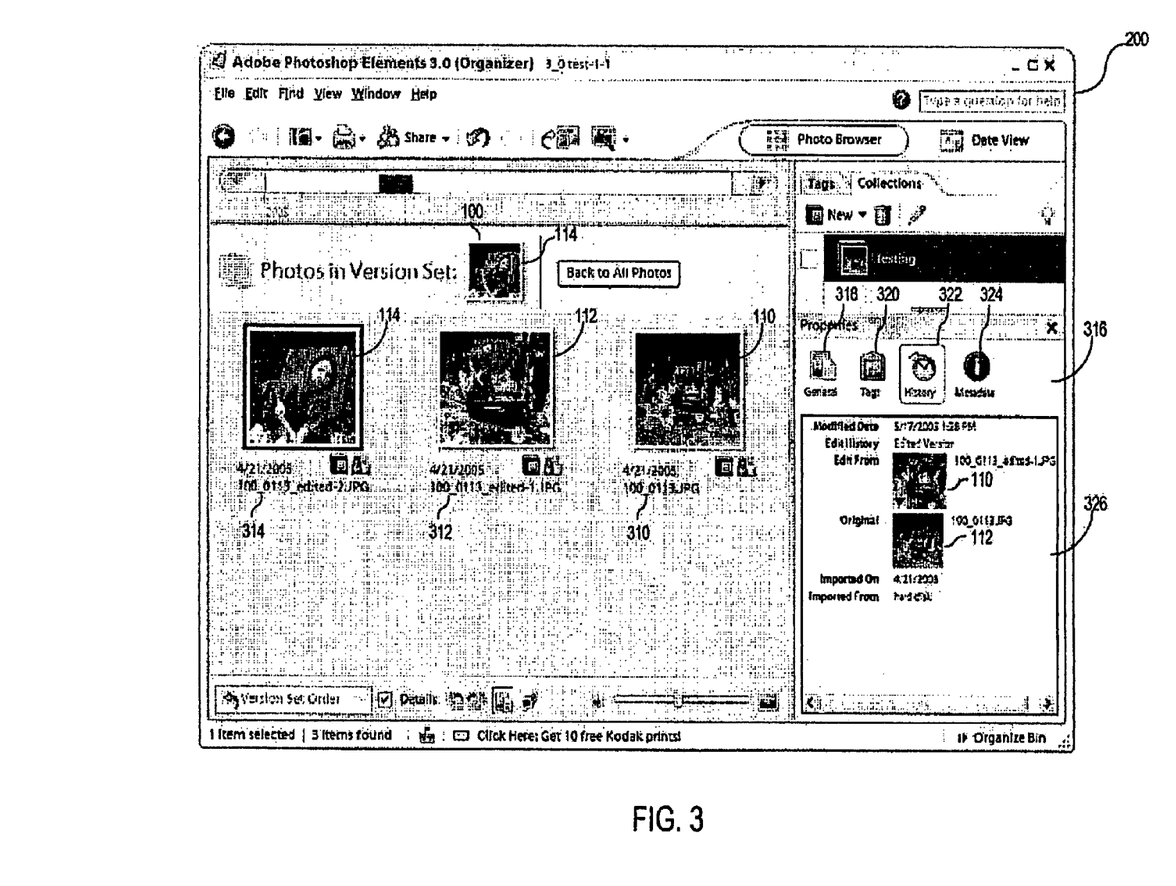
FIG. 3 is a diagram of a program to view and/or show one or more properties of a version set in accordance with one or more embodiments.

Referring now to FIG. 3, a diagram of a program to view and/or show one or more properties of a version set in accordance with one or more embodiments will be discussed. As shown in FIG. 3, program 200 may be utilized to display version set 100. In the example of FIG. 3, version set 100 may comprise first version 110, second version 112, and/or third version 114. Furthermore, program 200 may display information regarding the versions of the object, for example using label 310 for first version 110, label 312 for second version 112, and/or label 314 for third version 114. In one or more embodiments, program 200 may be Adobe® Photoshop® Elements 3.0 which may operate as a photo browser to view, render, manipulate, and/or edit version set 100. In properties box 316 of program 200, information regarding version set 100 may be accessed by a user. One or more icons may be utilized by a user to access various types of information, for example general icon 318, tags icon 320, history icon 322, and/or metadata icon 324. In one embodiment, when a user selects history icon 322, information pertaining to version set 100 may be displayed for example in window 326, including but not limited to a date on which version set 100 was last modified, and/or an edit history of the current version of the object, which in the example shown in FIG. 3 is third version 114, which may indicate for example that the current version of the object is an edited version. Furthermore, in window 326 an original version of the object may be displayed, which in the example shown in FIG. 3 may be first version 110, and/or one or more intermediate versions may be displayed, for example version 112. As shown in window 326, where the current version of the object may be third version 114, which may be displayed as the representation of the object in version set 100, an edit history may indicate that the current version, third version 114, may have been generated by editing second version 112 as indicated as "Edited From". Window 326 may provide an edit history that may indicate that second version 112 may have been generated by editing first version, which may be an original version of the object as indicated as "Original", although the scope of claimed subject matter is not limited in this respect.

Figure 4:
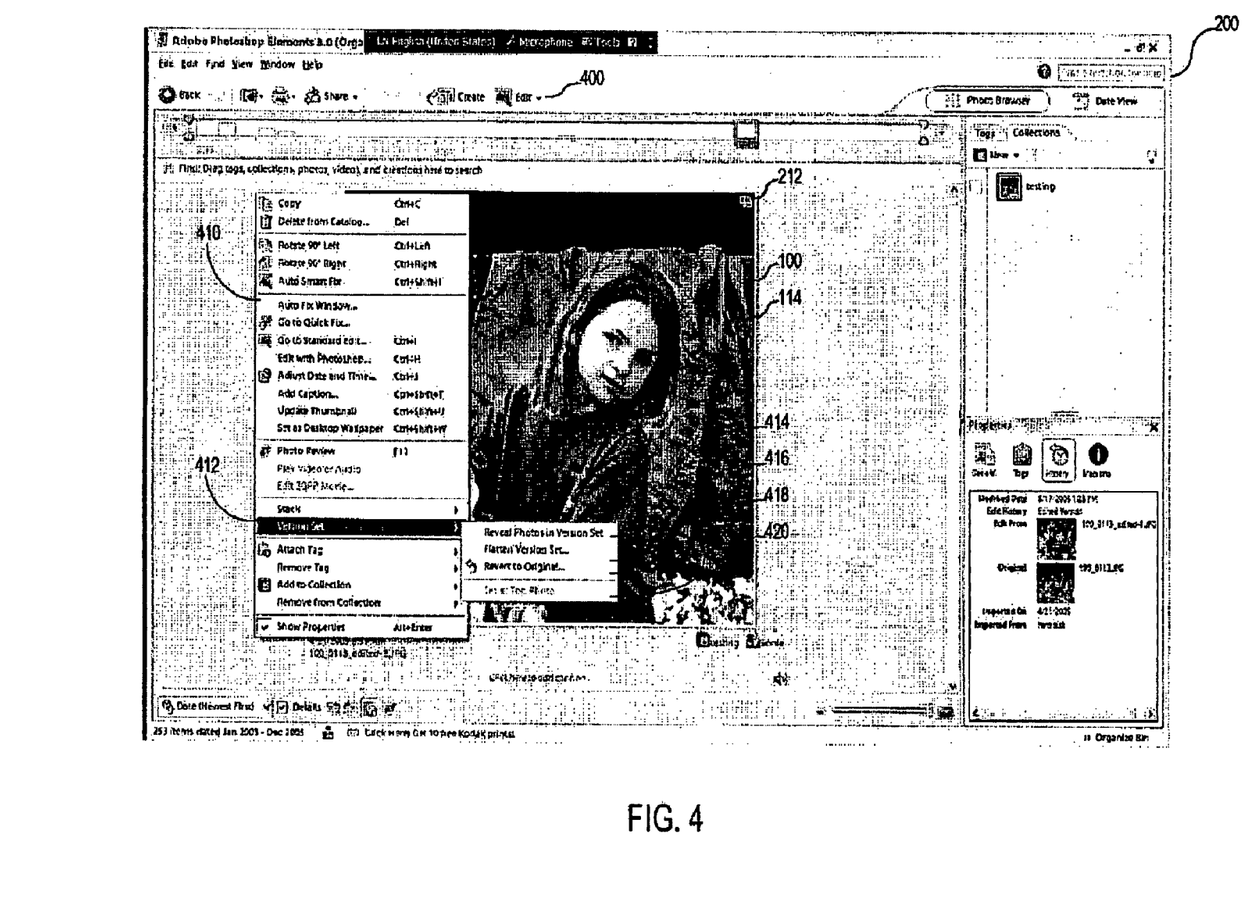
FIG. 4 is a diagram of a program to view and/or manipulate a version set in accordance with one or more embodiments.

Referring now to FIG. 4, a diagram of a program to view and/or manipulate a version set in accordance with one or more embodiments will be discussed. As shown in FIG. 4, version set 100 may be displayed and/or rendered by program 200. In the example shown in FIG. 4, version set 100 may be displayed where third version 114 may be set as the current version of the object. A user may utilize an edit icon 400 on a toolbar of program 200 to display a menu 410 with which the user may enter a command to control one or more aspects of version set 100. In an alternative embodiment, menu 410 may be displayed by right-clicking on version set 100. For example, menu 410 may include a version set submenu 412 that may allow the user to provide one or more commands to program 200. For example, in one embodiment, version set submenu 412 may include first command ("Reveal Photos in Version Set") 414 with which a user may enter a command to cause program 200 to show thumbnails of most and/or all of the file versions in version set, for example as shown in FIG. 3. As another example of a command, in one embodiment, version set submenu 412 may include second command ("Flatten Version Set") 416 with which a user may enter a command to cause program 200 to remove most and/or all versions from version set 100 except for the top and/or current version, which may be for example third version 114 as shown in FIG. 4. In one particular embodiment, after a flatten command is executed, version set 100 may no longer exist since the object may currently comprise a single version, for example third version 114 may then be the only version, rather than a set of versions. In one or more embodiments, a version set may refer to a set of two or more files comprising an original and/or master file and one or more other versions that may be, for example, direct edits of the original version and/or derived edits, for example an edited version of an edited version of the original version, although the scope of claimed subject matter is not limited in this respect. Various other commands may furthermore be included on version set submenu 412, for example, a command to remove one or more versions from version set 100, a command to convert version set 100 to individual objects for example where a relationship among multiple versions had been established to create version set 100, such a relationship may be removed, thereby eliminating version set 100, although the scope of claimed subject matter is not limited in this respect.

As yet another example of a command, in one embodiment, version set submenu 412 may include third command ("Revert to Original") 418 with which a user may enter a command to cause program 200 to remove all versions from the version set except the original and/or master version of the object. After execution of a revert command, as with the flatten command, version set may no longer exist since the only remaining version may be the original and/or master version of the object. As yet a further example, of a command, in one embodiment, version set submenu 412 may include fourth command ("Set as Top Photo") 420 with which a user may enter a command to cause program 200 to set a selected version as the current and/or top version, for example, third version 114 may be set to the current version as shown in FIG. 4. In one embodiment, for example, a user may utilize a "Reveal" command to show one or more of the versions in version set 100, and then select a version to be set as the top photo. Stack icon 212 may indicate that version set is being displayed in a stack mode, and third version 114 may be the current and/or top version of the object that is displayed when version set is in a stack mode, although the scope of claimed subject matter is not limited in this respect. Using fourth command 420, for example a "Set as Top Photo" command, a user may indicate to program 200 that the current and/or top version is the version to be utilized by program 200 when version set 100 is acted upon by program 200. For example, where third version 114 is set as the current and/or top version using fourth command 420, program 200 may print third version 114 when a print command is executed on version set 100, and/or may e-mail third version 114 when an e-mail command is executed on version set 100, and so on, although the scope of claimed subject matter is not limited in this respect. As shown in the example of FIG. 4, in one embodiment, fourth command 420 may be grayed out when the selected version is already set as the top photograph.

In one or more embodiments, version set 100 may include several versions of the object. In some cases, a user may wish to discard one or more of the versions, while retaining other versions of the object in version set 100. A user may select to discard one or more of the versions of the object from version set, for example using version set submenu 412 to enter a command, and version set 100 may retain its characteristics as a version set after one or more versions of the object are discarded. In one or more embodiments, when one or more versions of the object is removed from version set 100, associations in a database to manage version set 100, such as database 700 of FIG. 7, may be changed so that any edits and/or changes to other versions that are derived from a removed version may be altered so that the other versions may be based on, for example, an original version and/or a version from which the removed version was derived, for example a parent version of the removed version, although the scope of claimed subject matter is not limited in this respect. For example, as shown in FIG. 1, if third version 114 is edited to arrive at sixth version 120, the database may include information that sixth version 120 is based on third version 114. When sixth version 120 is edited to arrive at seventh version 122, then the database may include information that seventh version 122 is based on sixth version 120. If sixth version 120 is subsequently removed from version set 100, then information in the database may be updated to reflect that seventh version 122 is based on third version 114. In the case where versions of the object in version set 100 are based on an original version such as first version 110, and the original version is removed from version set 100, or otherwise where a version is removed and there may be no other earlier version to designate as a parent version, in one or more embodiments of such a case, version set 100 may be changed to a generic stack of objects. The database in such an embodiment may retain information that the objects may still have a relationship, and other including information, tags, metadata, history information, and so on may further be retained, and/or alternatively may be discarded. Furthermore, in one or more embodiments, if versions of the object are removed from version set 100, leaving one version in version set 100, version set 100 may likewise no longer be defined, and information in the database may be discarded, although the scope of claimed subject matter is not limited in this respect.

In one or more embodiments, version set 100 may be created in various ways. In one embodiment, version set 100 may be created automatically by program 200. For example, when a user edits an object, a new version of the object may be created in addition to the original version, and program 200 may automatically create version set 100 based on the original version and the new version. In one particular embodiment, a user may enter a command into program 200, for example "Auto SmartFix" as shown on menu 410, which may cause program 200 to automatically create version set 100 based on a group of objects being edited. In another embodiment, a user may manually create version set 100, for example using a save dialog that may present version set creation and/or save options to the user. Thus, when a user saves an edited version of an object, a user may select to save the edited version of the object and associated the edited version of the object with the original version to create version set 100. For example, such a dialog command may instruct program 200 to save an edited version of the object in a version set with an original version of the object. However, these are merely examples of how a version set may be created, and the scope of claimed subject matter is not limited in these respects.

Figure 5:
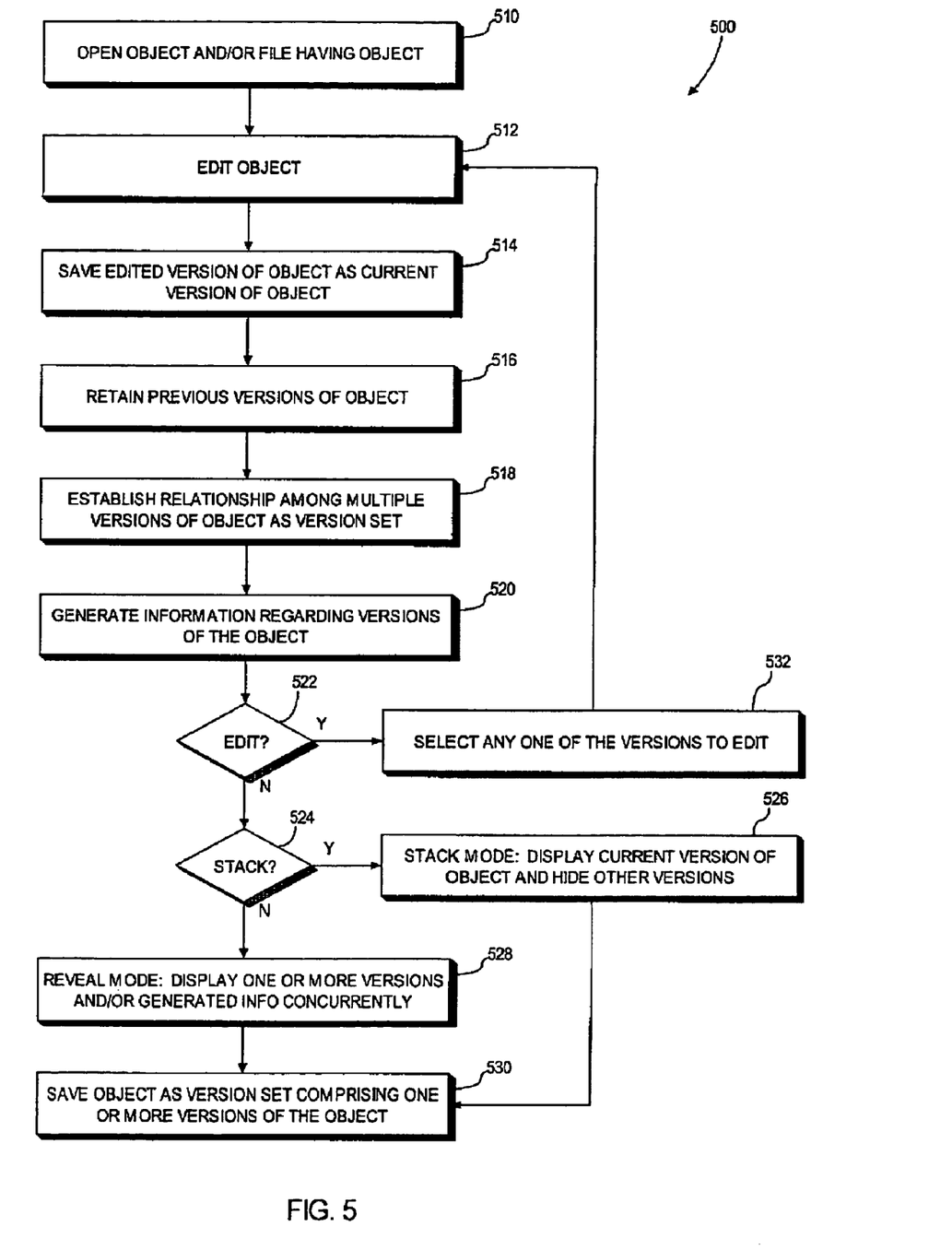
FIG. 5 is a flow diagram of a process to create, view, show, and/or edit a version set in accordance with one or more embodiments.

Referring now to FIG. 5, a flow diagram of a process to create, view, show, and/or edit a version set in accordance with one or more embodiments will be discussed. As shown in FIG. 5, process 500 may comprise blocks 510 through 530. Process 500 may include more and/or fewer blocks than shown in FIG. 5, and furthermore the blocks of process 500 may appear in any order, and process 500 is not necessarily limited to the order shown in FIG. 5. Process 500 may be executed as a program of instructions running on a computing platform, for example computing platform 600 shown in FIG. 6, although the scope of claimed subject matter is not limited in this respect. In one or more embodiments, process 500 may be executed by program 200 for example as shown in FIG. 2, FIG. 3, and/or FIG. 4, and/or alternatively may be executed as part of an application programming interface (API) of an operating system of a computing platform, and/or may be executed as another part and/or parts of an operating system of a computing platform, and the scope of claimed subject matter is not limited in this respect.

In one or more embodiments, an object and/or a file having an object may be opened at block 510. The object may be edited at block 512, for example in response to edit commands received by a user. An edited version of the object may be saved at block 514 and designated as a current version of the object. One or more previous versions of the object may be retained at block 516, for example where there may be two or more versions of the object where the versions may be saved as individual files, although the scope of claimed subject matter is not limited in this respect. A relationship among multiple versions of the object may be established as a version set at block 518. Information may be generated at block 520 regarding the multiple versions of the object. A determination may be made at block 522 whether to perform another edit, and if so, a selection may be made at block 532 to edit any one or more of multiple versions of the object. Process 500 may then continue execution at block 512 where the object may be further edited and further versions of the object may be generated in the version set.

In the event of no further edits, at least currently, a determination may be made at block 524 whether to display the version set in a stacked mode, and if so, in a stacked mode a current version of the object may be displayed and one or more other versions of the object may be hidden at block 526. Optionally, an icon such as stack icon 212 may be utilized to indicate that the version set is being displayed in a stacked mode. Such a stack mode is shown, for example, in FIG. 2. If a stack mode is not selected, one or more of the multiple versions may be displayed in a reveal concurrently at block 528 in a reveal mode, optionally with information pertaining to the version set and/or the displayed multiple versions of the object. In such a reveal mode, the multiple versions of the object may be shown concurrently for example in a planar and/or a grid layout or the like, for example as shown in FIG. 3.

Figure 6:
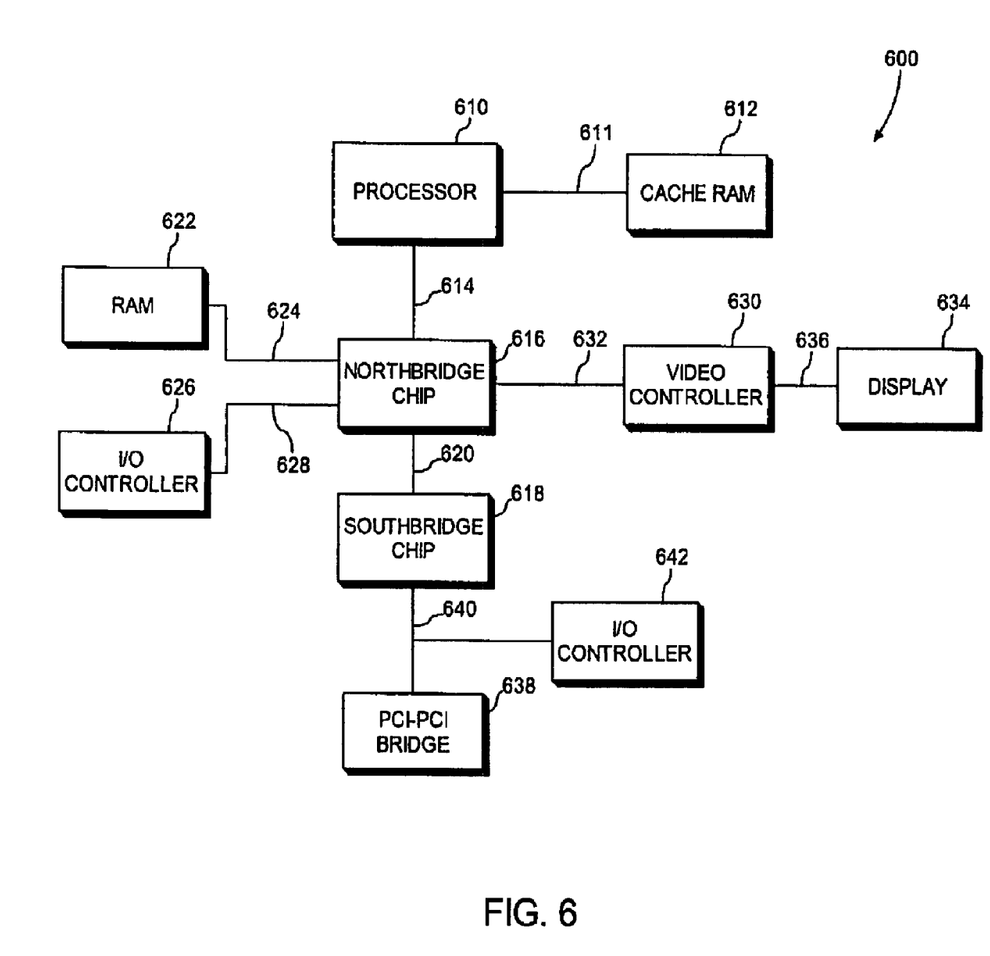
FIG. 6 is a block diagram of a computing platform suitable to execute a program to create, view, show, and/or edit a version set in accordance with one or more embodiments.

Referring now to FIG. 6, a block diagram of a computing platform capable of executing a process to create, view, show, and/or edit a version set in accordance with one or more embodiments will be discussed. It should be noted that computing platform 600 of FIG. 6 is merely one type of computing platform, and other computing platforms having more and/or fewer components than shown in FIG. 6 may be implemented, and the scope of claimed subject matter is not limited in this respect. In one or more embodiments, computing platform 600 may be utilized to implement process 500 in whole and/or using more and/or fewer blocks than shown in FIG. 5, and the scope of claimed subject matter is not limited in this respect.

In one or more embodiments, computing platform 600 may include processor 610 coupled to cache random access memory (RAM) 612 via back side bus 611. Processor 610 may also couple to a chipset that includes Northbridge chip 616 via front side bus 614, and also to Southbridge chip 618 via bus 620. In one embodiment, Northbridge chip 616 in general may be utilized to connect a processor to memory, to an input/output bus, to a video bus, and to Level 2 cache, although the scope of claimed subject matter is not limited in this respect. In one embodiment, Southbridge chip 618 may be utilized to control input/output functions, the basic input/out system (BIOS), an interrupt control functions of Integrated Drive Electronics (IDE) devices such as hard disks or compact disk-read only memory (CD-ROM) devices or the like, although the scope of claimed subject matter is not limited in this respect. Random access memory (RAM) 622 may couple to Northbridge chip 616 via main memory bus 624, and input/output (I/O) controller 626 may also couple to Northbridge chip 616 via I/O bus 628. In one embodiment, I/O controller 626 and I/O bus 628 may be in compliance with a Small Computer Systems Interface (SCSI) specification such as the American National Standards Institute (ANSI) X3.131-1994 SCSI-2 specification, although the scope of claimed subject matter is not limited in this respect. In an alternative embodiment, I/O controller 626 and I/O bus 628 may be in compliance with a Peripheral Component Interconnect (PCI) bus, although the scope of claimed subject matter is not limited in this respect.

Video controller 630 may couple to Northbridge chip 616 via video bus 632 which in one embodiment may comprise an Accelerated Graphics Port (AGP) bus, although the scope of claimed subject matter is not limited in this respect. Video controller 630 may provide video signals to an optionally coupled display 634 via display interface 636 which in one embodiment may comprise a Digital Visual Interface (DVI) in compliance with a standard promulgated by the Digital Display Working Group, although the scope of claimed subject matter is not limited in this respect. Southbridge chip 618 may couple to a peripheral component interconnect to peripheral component interconnect (PCI-PCI) bridge 638 via input/output bus 640, which may in turn couple to I/O controller 642 to control various peripheral devices such as Universal Serial Bus (USB) devices, or devices compatible with an Institute of Electrical and Electronics Engineers (IEEE) 1394 specification, although the scope of claimed subject matter is not limited in this respect.

Figure 7:
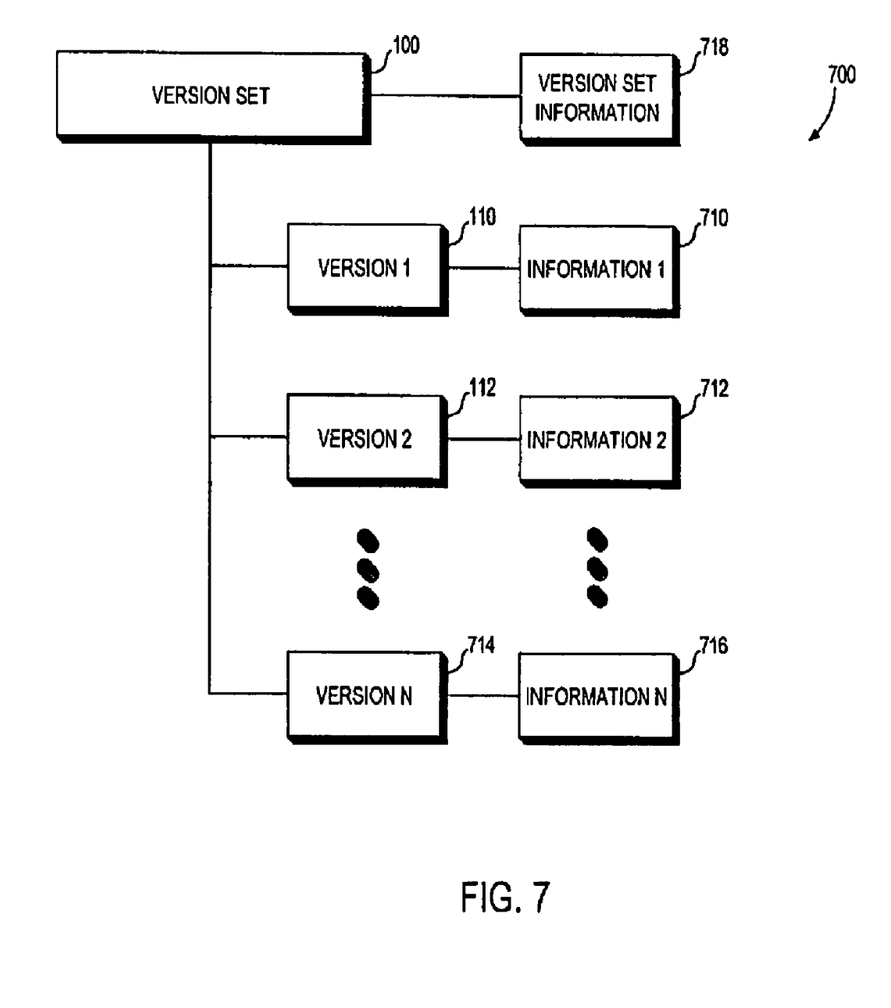
FIG. 7 is a block diagram of a database for managing a version set in accordance with one or more embodiments.

Referring now to FIG. 7, a block diagram of a database for managing a version set in accordance with one or more embodiments will be discussed. In one or more embodiments, database 700 may be utilized to manage version set 100. Version set 100 may include first version 110, second version 112, up to Nth version 714. Database 700 may track the multiple version of the object in version set 100, for example to provide program 200 with information pertaining to version set 100 wherein program may utilize such information to display, render, manipulate, and/or edit version set 100 based at least in part on database 700. In one or more embodiments, database 700 may provide information for the versions of the object wherein program 200 may utilize the information to display, render, manipulate, and/or edit version set 100 based at least in part on the information. For example, first version 110 may include first information 710, second version 112 may include second information 712, and/or Nth version 714 may include Nth information 716.

In one or more embodiments, information 710 through 716 may include, for example, general information pertaining to the versions of the object, for example, file type, program used to create and/or edit the versions, file size, location where the versions of the object may be stored, and/or the like. In one or more embodiments, information 710 through 716 may include one or more types and/or subtypes of information, for example information 710 through 716 may include one or more tags for example to store information about the object and/or versions, such as, where the object is a photograph, what the photograph is, who and/or what is in the photograph, when and/or where the photograph was taken, and so on. Although not shown, each of the versions may have multiple pieces of information associated therewith, and/or version set 100 may also have one or more pieces of information associated therewith, for example version set information 718, and the scope of claimed subject matter is not limited in this respect. In one or more alternative embodiments, information 710 through 716 may include, for example, information and/or a command pertaining to how the versions of the object should be formatted to be utilized, for example, by program 200. In one or more further alternative embodiments, information 710 through 716 may include metadata such as information pertaining to how and/or when the versions of the object were created, and/or the like. In yet one or more further alternative embodiments, information 710 though 716 may include history information, for example information pertaining to the version of the object on which the present version was based at least in part. Such history information and/or version edit pathways is show, for example, in FIG. 1. In one or more embodiments, first information 710 may be master and/or parent information for subsequent versions of the object, for example where first version 110 is an original version of the object. In such embodiments, first information 710 may include information pertaining to all and/or most of the versions of the object in version set 100, for example the filename of first version 110 where the filenames of subsequent versions may be based at least in part on the filename of first version 110. However, these are merely some examples of the type of information that may be stored in database 700 for corresponding versions of an object for version set 100, and the scope of claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to a version set of related objects and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
    processing electronic signals, via an object processor, to edit a first version of an object to create a second version of the object;
    maintaining information in a memory regarding a first association between said second version and said first version, said first association based, at least in part, on edits to said first version;
    processing electronic signals, via said object processor, to edit said second version of the object to create a third version of the object;
    maintaining information in a memory regarding a second association between said third version and said second version, said second association based, at least in part, on edits to said second version;
    processing electronic signals, via said object processor, to group the first version of the object, the second version of the object, and the third version of the object to create a version set, the version set comprising the first version of the object, the second version of the object, and the third version of the object;
    selectively displaying the version set as a stacked version set by displaying an editable rendering of one of the versions of the version set without displaying the other versions of the version set, wherein said displaying the stacked version set comprises displaying an icon to indicate that the displayed version of the object represents a stacked version set comprising multiple versions and wherein the editable rendering of the one version is capable of being edited to create a new version of the object;
    removing said second version of the object from said version set; and
    in response to said removing said second version of the object from said version set:
        creating a new association between said third version and said first version; and
        storing information in a memory regarding said new association, wherein said new association is based, at least in part, on edits to said first version.

2. A method as claimed in claim 1, further comprising processing electronic signals to designate a selected one of the versions of the object as a current version of the object, wherein the current version of the object is displayed as a thumbnail to represent the version set.

3. A method as claimed in claim 1, further comprising:
    processing electronic signals to designate by default a latest version of the object as a current version of the object.

4. A method as claimed in claim 1, further comprising:
    processing electronic signals to display the version set by displaying an editable rendering of said current version of the object and without displaying one or more other versions of the object in a first mode, and displaying the version set by displaying two or more versions of the object concurrently in a second mode.

5. A method as claimed in claim 1, wherein the object comprises at least one of an image, a photograph, a file, a slideshow, a video file, an audio file, a multimedia file, a hypertext markup language type file, a word processor file, and/or a portable document format type file.

6. A method as claimed in claim 1, further comprising:
    for a subsequent editing of the object, processing electronic signals to edit any one of the versions of the object in the version set to create a subsequent version of the object, wherein the subsequent version of the object is included in the version set.

7. A method as claimed in claim 1, further comprising:
responsive to performing an operation on the version set, processing electronic signals to perform the operation on a current version of the object in the version set.

8. An apparatus, comprising:
means for editing a first version of an object to create a second version of the object;
means for maintaining information regarding a first association between said second version and said first version, said first association based, at least in part, on edits to said first version;
means for editing the second version of the object to create a third version of the object;
means for maintaining information regarding a second association between said third version and said second version, said second association based, at least in part, on edits to said second version;
means for grouping the first version of the object, the second version of the object, and the third version of the object to create a version set, the version set comprising the first version of the object, the second version of the object, and the third version of the object;
means for selectively displaying the version set as a stacked version set by displaying an editable rendering of one of the versions of the version set without displaying the other versions of the version set, wherein said displaying the stacked version set comprises an icon to indicate that the displayed version of the object represents a stacked version set comprising multiple versions, and wherein the editable rendering of the one version is capable of being edited to create a new version of the object;
means for removing said second version of the object from said version set; and
means for, in response to said removing said second version of the object from said version set:
creating a new association; and
storing information in a memory regarding said new association between said third version and said first version, wherein said new association is based, at least in part, on edits to said first version.

9. An apparatus as claimed in claim 8, further comprising means for designating a selected one of the versions of the object as a current version of the object, said means for selectively displaying to display the current version of the object as a thumbnail to represent the version set.

10. An apparatus as claimed in claim 8, further comprising means for designating by default a latest version of the object as a current version of the object.

11. An apparatus as claimed in claim 8, further comprising means for displaying the version set by displaying an editable rendering of said current version of the object and without displaying one or more other versions of the object in a first mode, and means for displaying the version set by displaying two or more versions of the object concurrently in a second mode.

12. An apparatus as claimed in claim 8, wherein the object comprises at least one of an image, a photograph, a file, a slideshow, a video file, an audio file, a multimedia file, a hypertext markup language type file, a word processor file, and/or a portable document format type file.

13. An apparatus as claimed in claim 8, further comprising means for editing any one of the versions of the object in the version set to create a subsequent version of the object for a subsequent editing of the object, wherein the subsequent version of the object is included in the version set.

14. An apparatus as claimed in claim 8, further comprising means for performing the operation on a current version of the object in the version set responsive to performing an operation on the version set.

15. An article of manufacture comprising a storage medium having stored thereon instructions that, in response to being executed by a processor, direct said processor to:
edit a first version of an object to create a second version of the object;
maintain information regarding a first association between said second version and said first version, said first association based, at least in part, on edits to said first version;
edit the second version of the object to create a third version of the object;
maintain information regarding a second association between said third version and said second version, said second association based, at least in part, on edits to said second version;
group the first version of the object, the second version of the object, and the third version of the object to create a version set, the version set comprising the first version of the object, the second version of the object, and the third version of the object;
selectively display the version set as a stacked version set by displaying an editable rendering of one of the versions of the version set without displaying the other versions of the version set, wherein said displaying the stacked version set comprises displaying an icon to indicate that the displayed version of the object represents a stacked version set comprising multiple versions and wherein the editable rendering of the one version is capable of being edited to create a new version of the object;
remove said second version of the object from said version set; and
in response to said removal of said second version of the object from said version set:
create a new association between said third version and said first version; and
store information in a memory regarding said new association, wherein said new association is based, at least in part, on edits to said first version.

16. An article of manufacture as claimed in claim 15, wherein the instructions, in response to being executed by said processor, further direct said processor to designate a selected one of the versions of the object as a current version of the object, wherein the current version of the object is displayed as a thumbnail to represent the version set.

17. An article of manufacture as claimed in claim 15, wherein the instructions, in response to being executed by said processor, further direct said processor to designate by default a latest version of the object as a current version of the object.

18. An article of manufacture as claimed in claim 15, wherein the instructions, in response to being executed by said processor, further direct said processor to display the version set by displaying an editable rendering of said current version of the object and without displaying one or more other versions of the object in a first mode, and displaying the version set by displaying two or more versions of the object concurrently in a second mode.

19. An article of manufacture as claimed in claim 15, wherein the object comprises at least one of an image, a photograph, a file, a slideshow, a video file, an audio file, a multimedia file, a hypertext markup language type file, a word processor file, and/or a portable document format type file.

20. An article of manufacture as claimed in claim 15, wherein the instructions, in response to being executed by said processor, further direct said processor to, for a subsequent editing of the object, edit any one of the versions of the object in the version set to create a subsequent version of the object, wherein the subsequent version of the object is included in the version set.

21. An article of manufacture as claimed in claim 15, wherein the instructions, in response to being executed by said processor, further direct said processor to, responsive to performing an operation on the version set, perform the operation on a current version of the object in the version set.

22. An apparatus comprising a computer platform comprising a processor programmed with instructions to:
   edit a first version of an object to create a second version of the object;
   maintain information regarding a first association between said second version and said first version, said first association based, at least in part, on edits to said first version;
   edit the second version of the object to create a third version of the object;
   maintain information regarding a second association between said third version and said second version, said second association based, at least in part, on edits to said second version;
   group the first version of the object, the second version of the object, and the third version of the object to create a version set, the version set comprising the first version of the object, the second version of the object, and the third version of the object;
   selectively display the version set as a stacked version set by displaying an editable rendering of one of the versions of the version set without displaying the other versions of the version set, wherein said displaying the stacked version set comprises an icon to indicate that the displayed version of the object represents a stacked version set comprising multiple versions and wherein the editable rendering of the one version is capable of being edited to create a new version of the object;
   remove said second version of the object from said version set; and
   in response to said removing said second version of the object from said version set:
      create a new association between said third version and said first version; and
      storing information in a memory regarding said new association, wherein said new association is based, at least in part, on edits to said first version.

23. An apparatus as claimed in claim 22, the processor being further programmed with instructions to designate a selected one of the versions of the object as a current version of the object, the current version of the object to be displayed as a thumbnail to represent the version set.

24. An apparatus as claimed in claim 22, the processor being further programmed with instructions to designate by default a latest version of the object as a current version of the object.

25. An apparatus as claimed in claim 22, the processor being further programmed with instructions to initiate display of the version set by display of an editable rendering of said current version of the object and without displaying one or more other versions of the object in a first mode, and to display the version set by displaying two or more versions of the object concurrently in a second mode.

26. An apparatus as claimed in claim 22, wherein the object comprises at least one of an image, a photograph, a file, a slideshow, a video file, an audio file, a multimedia file, a hypertext markup language type file, a word processor file, and/or a portable document format type file.

27. An apparatus as claimed in claim 22, the processor being further programmed with instructions to, for a subsequent editing of the object, edit anyone of the versions of the object in the version set to create a subsequent version of the object, wherein the subsequent version of the object is included in the version set.

28. An apparatus as claimed in claim 22, the processor being further programmed with instructions to, responsive to performing an operation on the version set, perform the operation on a current version of the object in the version set.

29. A method, comprising:
   processing electronic signals, via a processor, to group a first version of an object, a second version of the object, and a third version of the object as a version set;
   maintaining information in a memory regarding a first association between said second version and said first version, said first association based, at least in part, on edits to said first version;
   maintaining information in a memory regarding a second association between said third version and said second version, said second association based, at least in part, on edits to said second version;
   removing said second version of the object from said version set;
   in response to said removing said second version of the object from said version set:
      creating a new association between said third version and said first version; and
      maintaining information in a memory regarding said new association, wherein said new association is based, at least in part, on edits to said first version; and
   displaying the version set as a stacked version set in conjunction with one or more non-version sets, wherein at least one of the stacked version set and/or one or more non-version sets may be selected for further action, and wherein the stacked version set is visually distinguishable from the one or more non-version sets as a stacked version set comprising multiple versions, wherein said displaying includes rendering the stacked version set as an editable representation of at least one of the versions of the version set, wherein the editable representation of at least one of the versions is capable of being edited to create a new version of the object.

30. A method as claimed in claim 29, wherein said displaying includes rendering the stacked version set as an editable representation of at least one of the first version, the second version, or the third version, wherein the representation comprises at least one of an icon or a thumbnail.

31. A method as claimed in claim 29, wherein said displaying includes displaying an icon that indicates that the version set is a stacked version set type.

32. A method as claimed in claim 29, wherein said displaying includes rendering the stacked version set as an editable representation of at least one of the first version, the second version, or the third version, wherein the representation comprises a thumbnail associated with an identifier indicating that the version set is a stacked version set type.

33. A method as claimed in claim 29, further comprising:
   processing electronic signals to set one of the first version, the second version, or the third version as a current version, said displaying including representing the stacked version set with the current version.

34. A method as claimed in claim 29, further comprising: processing electronic signals to set one of the first version, the second version, or the third version as a current version, said displaying including representing the stacked version set with a thumbnail of the current version.

35. A method as claimed in claim 29, wherein one of the first version of the object and/or the second version of the object is an edited version of another one of the first version of the object and/or the second version of the object.

36. An article of manufacture comprising a storage medium having stored thereon instructions that, in response to being executed by a processor, direct said processor to:
  group a first version of an object, a second version of the object, and a third version of the object as a version set maintaining information regarding a first association between said second version and said first version, said first association based, at least in part, on edits to said first version;
  maintaining information regarding a second association between said third version and said second version, said second association based, at least in part, on edits to said second version;
  removing said second version of the object from said version set;
  in response to said removing said second version of the object from said version set:
    creating a new association between said third version and said first version; and
    storing information in a memory regarding said new association, wherein said new association is based, at least in part, on edits to said first version; and
  display the version set as a stacked version set in conjunction with one or more non-version sets, wherein at least one of the stacked version set and/or one or more non-version sets may be selected for further action, and wherein the stacked version set is visually distinguishable from the one or more non-version sets as a stacked version set comprising multiple versions, wherein said displaying includes rendering the stacked version set as an editable representation of at least one of the versions of the version set wherein the editable representation of at least one of the versions is capable of being edited to create a new version of the object.

37. An article of manufacture as claimed in claim 36, wherein said instructions, in response to being executed by said processor, further direct said processor to render the stacked version set as an editable representation of at least one of the first version, the second version, or the third version, wherein the representation comprises at least one of an icon or a thumbnail.

38. An article of manufacture as claimed in claim 36, wherein said instructions, in response to being executed by said processor, further direct said processor to display an icon that indicates that the version set is a stacked version set type.

39. An article of manufacture as claimed in claim 36, wherein said instructions, in response to being executed by said processor, further direct said processor to display the stacked version set as an editable representation of at least one of the first version, the second version, or the third version, wherein the representation comprises a thumbnail associated with an identifier indicating that the version set is a stacked version set type.

40. An article of manufacture as claimed in claim 36, wherein said instructions, in response to being executed by said processor, further direct said processor to:
  set one of the first version, the second version, or the third version as a current version, said displaying including representing the stacked version set with the current version.

41. An article of manufacture as claimed in claim 36, wherein said instructions, in response to being executed by said processor, further direct said processor to:
  set one of the first version, the second version, or the third version as a current version, said displaying including representing the stacked version set with a thumbnail of the current version.

42. An article of manufacture as claimed in claim 36, wherein one of the first version of the object and/or the second version of the object is an edited version of another one of the first version of the object and/or the second version of the object.

* * * * *